United States Patent
Blizzard

(10) Patent No.: US 11,180,635 B2
(45) Date of Patent: Nov. 23, 2021

(54) COMPOSITIONS USEFUL IN PREPARING PLASTICS AND PAINTS

(71) Applicant: John D. Blizzard, Bay City, MI (US)

(72) Inventor: John D. Blizzard, Bay City, MI (US)

(73) Assignee: Quadsil, Inc., Midland, MI (US)

( * ) Notice: Subject to any disclaimer, the term of this patent is extended or adjusted under 35 U.S.C. 154(b) by 0 days.

(21) Appl. No.: 15/687,743

(22) Filed: Aug. 28, 2017

(65) Prior Publication Data

US 2018/0072870 A1     Mar. 15, 2018

Related U.S. Application Data

(60) Provisional application No. 62/394,254, filed on Sep. 14, 2016.

(51) Int. Cl.
| | |
|---|---|
| *C08K 5/5419* | (2006.01) |
| *C07F 7/08* | (2006.01) |
| *C08F 10/06* | (2006.01) |
| *C08B 15/00* | (2006.01) |
| *C08K 5/00* | (2006.01) |

(52) U.S. Cl.
CPC ............ *C08K 5/5419* (2013.01); *C07F 7/081* (2013.01); *C08B 15/00* (2013.01); *C08F 10/06* (2013.01); *C08K 5/0058* (2013.01)

(58) Field of Classification Search
None
See application file for complete search history.

(56) References Cited

U.S. PATENT DOCUMENTS

| | | | | |
|---|---|---|---|---|
| 2008/0274420 | A1* | 11/2008 | Song ................... | G03G 9/08773 430/104 |
| 2010/0196621 | A1* | 8/2010 | Larson-Smith ........ | C08G 79/10 427/539 |

\* cited by examiner

*Primary Examiner* — Robert T Butcher
(74) *Attorney, Agent, or Firm* — Marshall & Melhorn, LLC

(57) ABSTRACT

Compositions of matter that are useful in the preparation of plastics and paints. These compositions contain a large number of silanol groups bonded to the silicon atoms that provide water solubility and/or disperseability of such materials in aqueous solutions. In addition, these compositions contain organofunctional groups that are antimicrobial in nature. These compositions, when coupled with plastics and paints, provide antimicrobial properties to such plastics and paints as well as adhesion properties.

14 Claims, No Drawings

COMPOSITIONS USEFUL IN PREPARING PLASTICS AND PAINTS

This application is a utility application filed from Provisional patent application Ser. No. 62/394,254, filed Sep. 14, 2016 from which priority is claimed.

BACKGROUND OF THE INVENTION

This invention deals with new compositions of matter that are useful in the preparation of plastics and paints. These compositions contain a large number of silanol groups bonded to the silicon atoms that provide water solubility and/or disperseability of such materials in aqueous solutions. In addition, these compositions contain organofunctional groups that are antimicrobial in nature. These compositions, when coupled with plastics and paints, provide antimicrobial properties to such plastics and paints. Thus, in the case of plastics, the final plastic article, after being formed or molded has antimicrobial properties throughout the article, as opposed to having antimicrobial properties on just the outside surface from a coating of an antimicrobial material.

THE INVENTION

Thus, what is disclosed and claimed herein is a composition of matter. The composition of matter is an incipient mixture of at least two alkoxylated organofunctionalsilanes; a predetermined amount of acid or base, and water. Additionally, the composition of matter described and claimed herein provides products, such as plastic and paint products, with anti-microbial and/or adhesion properties when incorporated therein.

The composition of matter contains alkoxylated organofunctional silanes that are selected from the following silanes.

a. $(R'O)_3SiC_dH_{2d}N(H)(C_dH_{2d})NH_2$ wherein R' is an alkyl radical of from 1 to 4 carbon atoms and d is an integer of 1 or greater, b. $(R'O)_3SiC_dH_{2d}S^+(R^4)_2X^-$ wherein R' is an alkyl radical of from 1 to 4 carbon atoms, $R^4$ is independently an alkyl group or aralkyl group wherein there is a total of less than 60 carbon atoms in the molecule, d is an integer of 1 or greater and $X^-$ is a water soluble monovalent anion;

c. $(R'O)_3SiC_dH_{2d}S^+C(NH_2)_2X^-$ wherein R' is an alkyl radical of from 1 to 4 carbon atoms, wherein d is an integer of 1 or greater and $X^-$ is a water soluble monovalent anion;

d. $(R'O)_3SiC_dH_{2d}P^+(R^6)_3X^-$ wherein R' is an alkyl radical of from 1 to 4 carbon atoms, $R^6$ is independently selected from an alkyl group or aralkyl group wherein there is a total of less than 60 carbon atoms in the molecule, d is an integer of 1 or greater and $X^-$ is a water soluble monovalent anion e. $(R'O)_3Si—(R'')N^+(CH_3)_2(R''')Cl^-$, wherein R' is an alkyl radical of from 1 to 4 carbon atoms, R'' is an alkylene radical of three to six carbon atoms, R''' is an alkyl radical of 10 to 22 carbon atoms;

f. $(R'O)_3Si—(C_dH_{2d})SH$ wherein R' is an alkyl radical of from 1 to 4 carbon atoms, d is an integer of 1 or greater;

g. $(R'O)_3Si—(C_dH_{2d})Cl$ wherein R' is an alkyl radical of from 1 to 4 carbon atoms, d is an integer of 1 or greater;

h. $(R'O)_3Si—(C_dH_{2d})NH_2$ wherein R' is an alkyl radical of from 1 to 4 carbon atoms, d is an integer of 1 or greater i. $(R'O)_3Si—(C_dH_{2d})NH—(C=O)—NH_2$ wherein R' is an alkyl radical of from 1 to 4 carbon atoms, d is an integer of 1 or greater;

j. $(R'O)_2SiCH=CH_2$ wherein R' is an alkyl radical of from 1 to 4 carbon atoms;

k. $(R'O)_3SiCH_2CH=CH_2$ wherein R' is an alkyl radical of from 1 to 4 carbon atoms;

l. $(R'O)_2SiCH_2O—(C=O)—C(CH_3)=CH_2$ wherein R' is an alkyl radical of from 1 to 4 carbon atoms;

m. $(R'O)_3SiCH_3H_2O—(C=O)—C(CH_3)=CH_2$ wherein R' is an alkyl radical of from 1 to 4 carbon atoms;

n. $(R'O)_3SiC_3H_2N=C=O$ wherein R' is an alkyl radical of from 1 to 4 carbon atoms;

o. Methacryloxypropyltrimethoxysilane;

p. $(R'O)_3SiC_3H_6NH—(C=O)—OCH_3$ wherein R' is an alkyl radical of from 1 to 4 carbon atoms, q. $(R'O)_3SiC_3H_6OCH_2CH_2 (C=O)—CH_3$ wherein R' is an alkyl radical of from 1 to 4 carbon atoms;

r. $(R'O)_3SiC_3H_6NHCH_2CH_2NH$-benzyl-$CH=CH_2$ wherein R' is an alkyl radical of from 1 to 4 carbon atoms;

s. $(R'O)_3SiC_3H_6NHCH_2CH_2NH$-benzyl-$CH=CH_2 \cdot HCl$ wherein R' is an alkyl radical of from 1 to 4 carbon atoms, and, t. $(R'O)_3Si(CF_2)_n CF_3$ wherein $n$ has a value of from 1 to 10, and mixtures of such silanes.

In addition, another embodiment of this invention is a method of manufacturing a composition of matter comprising the use of at least two organofunctional silanes, a predetermined amount of acid or base, and, water, the method comprising mixing at least two desired organofunctional silanes together in a predetermined ratio and stirring for at least 30 minutes. Thereafter, adding a predetermined amount of the water and a predetermined amount of a material selected from the group consisting of (i) acid, and (ii) base, in a dropwise manner. Thereafter, mixing (ii) for at least sixty minutes.

In yet another embodiment, there is a composition of matter provided by the method as set forth just above.

Moreover, there is a second method of manufacturing a composition of matter comprising the use of at least two organofunctional silanes, a predetermined amount of acid or base and, water. The second method comprises (a.) providing one of the two or more desired organofunctional silanes and adding a predetermined amount of water and then either a predetermined amount of the acid or the base in a dropwise manner and stirring for at least sixty minutes. Thereafter, (b.) providing a second organofunctional silane and adding a predetermined amount of the water and either a predetermined amount of the acid or the base in a dropwise manner and stirring for at least sixty minutes. Thereafter, mixing the compositions from (a.) and (b.) and stirring for at least 10 minutes. In addition, there is an embodiment which is a composition of matter provided by the method as set forth just above.

A further embodiment is a method of forming plastic articles. The method comprises, prior to forming the article, adding a composition as set forth above for the first method, to a plastic in a desired ratio. Then, forming the article by maintaining any heat from said forming to less than 350° C., and then, allowing the formed article to cool. Also contemplated within the scope of this invention are the plastic articles provided by the method set forth just above.

Examples of plastic articles that are contemplated within the scope of the method are such articles as bottles, flat sheets, bags, especially food storage bags and blood bags for whole blood, blood plasma storage bags, and blood platelet storage bags. The compositions of this invention are also useful in providing antimicrobial and/or adhesion properties to paint. Thus, there is a method of providing a modified paint mixture. The method comprises providing a predetermined amount of formulated paint and adding a predetermined amount of the composition of matter as set forth Supra and then stirring the composition mixture for at least 10 minutes. Also contemplated within the scope of this invention is a product provided by the method as set forth just Supra.

The silanes useful in this invention are commercially available from several sources, such as, for example, Dow Corning Corporation, Midland, Mich., and Petrarch Systems, Bristol, Pa.

The methods of this invention are carried out essentially at room temperature. Excess heat may cause the mixed silanes in water to polymerize and gel and excess heat, for example, over about 50° C. should be avoided.

The compositions of matter are added to particulate plastics prior to forming, such as molding, extrusion, and the like. Excess heat in the forming operation should not be used, as some of the silanes will color the plastic at elevated temperatures. Individual methods of forming should be tested to evaluate if such coloring will be a result of the excess heat generated by the forming.

Using the compositions of matter in paint systems is a matter of simply blending the compositions with the already formulated paint.

The compositions of matter tend not to interfere with paint drying by extending drying time, but any excess of the compositions of matter in the paint may tend to gel the paint. It is recommended that small samples of the paint and the compositions of matter be tested to determine safe ranges for use of the compositions of matter.

EXAMPLES

Example 1

General Processing—

DC-5700 and Z-6030 (Dow Corning Corporation, Midland, Mich.) were placed into a 40 ml vial with a magnetic stirring bar. The functional trialkoxysilanes were added and allowed to mix for 30 minutes. Water, adjusted with KOH to ph 10 or HCl to pH 2, was added dropwise with agitation. This was allowed to hydrolyze for 24 hours after which the solution was evaluated for appearance. All weights are in grams. Compound molecular weights were used to calculate the Moles and molar ratios of each component.

|  | Mw | 26-1 | 26-2 | 26-3 |
|---|---|---|---|---|
| 5700 @ 42% | 496 | 23(54.7) | 56.8 (135.1) | 56.8 (135.1) |
| Z-6030 | 248 | 23 | 56.8 | 56.8 |
| H2O | 18 | 4.5 | 9 |  |
| moles 5700/6030/H2O |  | 0.46/0.93/2.5 | 1.15/2.29/5.0 | 1.15/2.29 |

Z-6030 is (MAPTMS) methacryloxypropyltrimethoxysilane

DC-5700 is 42% solids in methanol of $(CH_3O)_3Si(CH_2)N^+(CH_3)_2(C_{18}H_{37})$ $Cl^-$.

Samples 26-1, 26-2 and 26-3 were mixed into a white interior latex paint in the ratios listed below.

|  | A | B | C | D | E | F |
|---|---|---|---|---|---|---|
| Wal-Mart interior white 22145 paint | 100 | 100 | 100 | 100 | 100 | 100 |
| Sample 26-1 | 1 | 5 |  |  |  |  |
| Sample 26-2 |  |  | 1 | 5 |  |  |
| Sample 26-3 |  |  |  |  | 1 | 5 |

Samples E and F did not mix easily into the white paint and the resulting mixtures were full of hard lumps making them unusable. The white paint samples A-D were coated onto polyethylene film and allowed to dry for 48 hours at ambient. These dried film samples were evaluated for microbial activity. The *E. coli* (lot number 168756) was purchased from Quanti-Cult™ and is derived from original ATCC® stock cultures.

The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks and a wrist action shaker. The concentration of the suspension is determined using serial dilution and plate counts to determine the amount of Colony Forming Units (CFU's)/ml of suspension.

The materials tested in this study were small beads. Fifteen grams of each were added to 250 ml Erlenmeyer flasks. Fifty milliliters of phosphate buffer inoculated with *E. coli*, to an approximate concentration of $1 \times 10^5$ CFU/ml was added to the flasks, including a control flask. The flasks were placed on Burrell® Wrist Action Shaker at the highest wrist action speed, and shaken for one hour. At the end of the hour, aliquots of each were taken and serial dilutions done. Difco™ Tryptic Soy Agar (lot number1326359) was added to the plates and swirled to mix. Agar was allowed to solidify and samples were incubated for 24 hours at 35° C. to evaluate the effectiveness of the formulations in reducing *E. coli*.

| Material | Avg. CFU/ml | % Reduction |
|---|---|---|
| Bacteria Control | $9.2 \times 10^4$ | Not applicable |
| A | $6.4 \times 10^4$ | 30.4 |
| B | $8.6 \times 10^4$ | 6.5 |
| C | $1.64 \times 10^4$ | 60 |
| D | $5.6 \times 10^4$ | 39 |
| E | TNTC | NA |

Example 2

Ortho-Jet is a fast curing orthodontic acrylic resin powder and liquid obtained from Lang Dental Wheeling, Ill. Sample 26-2 was added to this two parts acrylic resin as shown below. This was mixed and allowed to cure at ambient for 24 hours. The cure rate was tested to determine the level of cure of the acrylic resins. As shown, the addition of the Sample 26-2 increased the cure rate, based on the level of addition.

|  | Sample | | | | |
|---|---|---|---|---|---|
|  | 1 | 2 | 3 | 4 | 5 |
| Ortho Jet Powder | 20.0 | 20.0 | 20.0 | 20.0 | 20.0 |
| Sample 26-2 |  | 1.0 | 2.0 | 5.0 | 10.0 |
| Ortho Jet Liquid | 10.0 | 10.0 | 10.0 | 10.0 | 10.0 |

-continued

|  | Sample | | | | |
| --- | --- | --- | --- | --- | --- |
|  | 1 | 2 | 3 | 4 | 5 |
| % 26-2 polymer added |  | 3.2 | 6.25 | 14.3 | 25.0 |
| cure time rate | 5 | 4 | 3 | 2 | 1 |

1 = Fastest

Samples 1-4 cured to a very hard, transparent resin. Sample 5 was brittle and easy to fracture.

Example 3

General Processing—

DC-5700 and Z-6030 were placed into a 40 ml vial with a magnetic stirring bar. The functional trialkoxysilanes were added and allowed to mix for 30 minutes. Water, adjusted with KOH to pH 10 or HCl to pH 2, was added dropwise with agitation. This was allowed to hydrolyze for 24 hours after which the solution was evaluated for appearance. All weights are in grams. Compound molecular weights were used to calculate the Moles and molar ratios of each component. Z-6040 is glycidoxypropyltrimethoxysilane from Dow Corning Corp.

|  | Mw | 137 |
| --- | --- | --- |
| 5700 @ 42% | 496 | 23(54.7) |
| Z-6040 | 236 | 23 |
| H2O pH = 2 | 18 | 4.5 |
| moles 5700/6030/H2O |  | 0.46/1.0/2.5 |

Sample 137 was mixed into a Dow Chemical Company Epoxy 324 resin and 29 catalyst using the following formula:

| Dow Chemical Company Epoxy 324 resin | 30.4 grams |
| --- | --- |
| Dow Chemical Company 29 catalyst | 0.58 grams |
| Sample 137 | 10.0 grams |

This was allowed to cure at ambient (23 C/50% R.H.) for 24 hours. The resulting film was clear with a very slight yellow tinge, very hard and somewhat flexible. The film was evaluated for antimicrobial properties.

Purpose:

The purpose of this study was to evaluate the effectiveness of various polymers, treated with a non-leaching antimicrobial, in killing or reducing *Escherichia coli* (*E. coli*), using Shake Flask ASTM Method E2149-10 (1). This test method was designed specifically to evaluate the antimicrobial activity of non-leaching, antimicrobial materials. The test was developed for routine quality control and screening tests in order to overcome difficulties in using classical antimicrobial test methods. Using this test, samples may be retrieved at pre-determined time points.

Study Design

The *E. coli* used, purchased from Quanti-Cult™, is derived from original ATCC® stock cultures. They were received dehydrated. They were then rehydrated with the supplied buffer and transferred to a sterile Erlenmeyer flask containing 100 ml of sterile Tryptic Soy Broth and incubated overnight at 35° C. The rehydrated cultures are only used for testing on the day of rehydration. A 1 ml aliquot of that culture is put into a sterile flask with fresh broth daily. If there will be a lapse in the use of the culture, for instance over the weekend, a streak plate of the culture can be made, incubated overnight and stored in the refrigerator for longer periods of time than those grown in flasks. These cultures can be checked for contamination in a couple of different ways. If the streak plate culture has non-uniform colonies or the flask cultures have a filmy appearance, the culture is most likely contaminated and the entire culturing process has to be repeated starting with a new dehydrated sample. Cultures can easily be contaminated by air borne bacteria or surface bacteria; therefore great care has to be taken to ensure the culture is not contaminated with other unwanted bacterium.

The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks. The flasks were placed on Burrell® Wrist Action Shaker. The concentration of the suspension is determined using serial dilution and plate counts to determine the amount of Colony Forming Units (CFU's)/ml of suspension. Antimicrobial activity is determined by comparing results from the test material to controls that were run simultaneously.

This epoxy type material was formulated at QuadSil® Inc. and is referred to as Sample 137 formulated using Dow Epoxy 324, Z-6040 and DC 5772 @ 72% NVC. After formulation and curing the material was crushed into a powder and tested as above using the Shake Flask Test. No non-antimicrobial control was used however; this sample was compared to a bacteria control. DC 5772 is 72 weight percent solids of $(CH_3O)_3Si(CH_2)_3N^+(CH_3)_2(C_{16}H_{37})$ $Cl^-$

TABLE

| Material | Time point | Average CFU/ml | % Reduction |
| --- | --- | --- | --- |
| Bacteria Control | 1 hour | TNTC | Not applicable |
| Sample 137 | 1 hour | Reduction |  |
| Bacteria Control | 2 hour | TNTC | Not applicable |
| Sample 137 | 2 hour | Reduction |  |
| Bacteria Control | 18 hour | TNTC | Not applicable |
| Sample 137 | 18 hour | 0 | 100 |

Discussion

Percent reduction for the first two time points could not be calculated because the bacteria control was too numerous to count.

Conclusions

Based on the results from this study, Sample 137, shows antimicrobial activity at one and two hours and 100% reduction at 18 hours.

Example 4

General Processing—

DC-5700 and Z-6030 were placed into a 40 ml vial with a magnetic stirring bar. The functional trialkoxysilanes were added and allowed to mix for 30 minutes. Water, adjusted with KOH to pH 10 or HCl to pH 2, was added dropwise with agitation. This was allowed to hydrolyze for 60 minutes and 24 hours after which the solution was evaluated for appearance. All weights are in grams. Compound molecular weights were used to calculate the Moles and molar ratios of each component.

This solution was added to Biofore Company UPM biocomposite materials that had been placed in water. The Biofore Company UPM biocomposite materials are described as: a new high-quality biocomposite suitable for manufacturing both consumer and industrial injection-molding products. Injection-molding granulates are manufactured from cellulose fiber and pure plastic polymers (polypropylene). The proportion of renewable fiber is typically 20-50%. The following samples were made by mixing the formulated Part A into the formulated Part B with constant agitation. The final product was placed in an air circulating oven at 45° C. for 4 hours to remove any volatiles

| Part | MW | 1A | 1B | 2A | 2B |
|---|---|---|---|---|---|
| 5772 @ 72% | 496 | 100 (72) | | 100 (72) | |
| 6030 | 248 | 6.88 | | 6.88 | |
| water pH = 10 | 18 | 20.8 | 800 | | 800 |
| UPM EFP-50 | | | 400 | | 400 |
| Mix, hours | | 24 | 1 | 1 | 24 |
| % NVC 1/105C | | 37.2 | | | |

| Part | MW | Lot 1A | Lot 1B | Lot 2A | Lot 2B |
|---|---|---|---|---|---|
| 5772 @ 72% | 496 | 100 (72) | | 100 (72) | |
| 6030 | 248 | 6.88 | | 6.88 | |
| water pH = 10 | 18 | 20.8 | | 20.8 | |
| UPM GP-40 | | | 400 | | 400 |
| PET Pellets | | | | | |
| Mix, hours | | 24 | 1 | 24 | 1 |

The resulting pellets were dry and free flowing. The pellets were evaluated for microbial action.

Antimicrobial Activity Evaluation Treated Polyethylene Pellets

Purpose:

The purpose of this study was to evaluate the effectiveness of killing or reducing *Escherichia coli* (*E. coli*), using Shake Flask ASTM Method E2149-10 on GP-40. This test method was designed to evaluate the antimicrobial activity of non-leaching, antimicrobial materials for routine quality control and screening tests in order to overcome difficulties in using classical antimicrobial test methods to evaluate substrate-bound antimicrobials. This dynamic shake flask test was developed for retrieval of aliquot samples at different contact times. Two separate lots of the GP-40 treated pellets were tested in this study.

Study Design

The *E. coli* (lot number 168756) was purchased from Quanti-Cult™ and is derived from original ATCC® stock cultures. The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks and a wrist action shaker.

The concentration of the suspension is determined using serial dilution and plate counts to determine the amount of Colony Forming Units (CFU's)/ml of suspension. The materials tested in this study were small beads. Fifteen grams of each were added to 250 ml Erlenmeyer flasks. Fifty milliliters of phosphate buffer inoculated with *E. coli*, to an approximate concentration of $1 \times 10^5$ CFU/ml was added to the flasks, including a control flask The flasks were placed on Burrell® Wrist Action Shaker at the highest wrist action speed, and shaken for one hour. At the end of the hour, aliquots of each were taken and serial dilutions done. Difco™ Tryptic Soy Agar (lot number 1326359) was added to the plates and swirled to mix. Agar was allowed to solidify and samples were incubated for 24 hours at 35° C. to evaluate the effectiveness of the formulations in reducing *E. coli*.

Results

After 1 hour the material was effective in killing >99.9% of the bacteria that it was exposed to.

TABLE

One Hour Time Point

| Material | Avg. CFU/ml | % Reduction | Log | Log Red. |
|---|---|---|---|---|
| Bacteria Control | $1.14 \times 10^5$ | Not applicable | 5.0 | Not applicable |
| GP-40 Lot 1 | 0 | >99.9 | 0 | 5 |
| GP-40 Lot 2 | 0 | >99.9 | 0 | 5 |

Example 5

The treated UPM pellets of Example 4 were used as a masterbatch to be compounded with polyethylene and extruded into sheet stock. A 1% and 4% by weight masterbatch pellets were mixed into virgin polyethylene pellets, melt extruded into sheet stock, and tested for microbial activity.

Antimicrobial Activity Evaluation of Sheeting

Purpose:

The purpose of this study was to evaluate the effectiveness of killing or reducing *Escherichia coli* (*E. coli*), using Shake Flask ASTM Method E2149-10 on samples. The samples were extruded from antimicrobial treated beads (GP-40). Two samples were submitted in the form of sheeting. The samples were labeled 4% and 1%. This test method was designed to evaluate the antimicrobial activity of non-leaching, antimicrobial materials for routine quality control and screening tests in order to overcome difficulties in using classical antimicrobial test methods to evaluate substrate-bound antimicrobials. The dynamic shake flask test was developed for retrieval of aliquot samples at different contact times.

Study Design

The *E. coli* (lot number 168756) was purchased from Quanti-Cult™ and is derived from original ATCC® stock cultures. They are received dehydrated. A viable streak plate was colonized from this culture. One colony was transferred to 5 ml of sterile Tryptic Soy Broth (lot #A3098) and incubated overnight.

The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks and a wrist action shaker. The concentration of the suspension is determined using serial dilution and plate counts to determine the amount of Colony Forming Units (CFU's)/ml of suspension.

The materials tested in this study are described in the Purpose section of this report. Sterile 0.3 mM $KH_2PO_4$ buffer was inoculated to a concentration of ~1.0-3.0×10$^5$ CFU/ml. A $T_0$ plate was prepared at a 1:100 dilution from the inoculated buffer for quantification. Three grams of each piece of sheeting was weighed out and cut in approximately 1 cm×1 cm pieces for increased surface area. Fifty ml of inoculated buffer were added to the sterile flasks. An additional flask was added, containing only the inoculated buffer as a control. The flasks were placed on Burrell® Wrist Action Shaker at the highest wrist action speed, and shaken for 24 hours. Using the direct plate count method in triplicate, aliquots of the inoculated buffer was taken from each flask at 1 hour, 4 hour, and 24 hour time points. Serial dilutions were added to sterile Petri dishes. Difco™ Plate Count Agar (lot number 2235495), prepared per package instructions was added to the plates at a temperature of less than 45° C. and swirled to mix. Agar was allowed to solidify and samples were incubated for 24 hours at 35° C. to evaluate the effectiveness of the formulations in reducing *E. coli*.

TABLE 2

Twenty Four Hour Time Point

| Material | Average CFU/ml | % Reduction |
|---|---|---|
| $T_0$ | 1.10 × 10$^5$ | Not Applicable |
| Bacteria Control | 4.08 × 10$^4$ | Not applicable |
| Sheeting 4% | 0 | >99.9 |
| Sheeting 1% | 0 | >99.9 |

Example 6

PET Treatment

DC-5700 and Z-6030 were placed into a 40 ml vial with a magnetic stirring bar. The functional trialkoxysilanes were added and allowed to mix for 30 minutes. Water, adjusted with KOH to pH 10 or HCl to pH 2, was added dropwise with agitation. This was allowed to hydrolyze for 60 minutes and 24 hours after which the solution was evaluated for appearance. All weights are in grams. Compound molecular weights were used to calculate the Moles and molar ratios of each component. This solution was added to PET pellets and mixed. The final product was placed in an air circulating oven at 45 C for four hours to remove any volatiles.

| | MW | Lot 3A | Lot 3B |
|---|---|---|---|
| 5772 @ 72% | 496 | 100 (72) | |
| 6030 | 248 | 6.88 | |
| water pH = 10 | 18 | 20.8 | |
| PET Pellets | | | 400 |
| Mix, hours | | 24 | 1 |

Antimicrobial Activity Evaluation Treated Pet Pellets Lot 3

Purpose:

The purpose of this study is to evaluate the effectiveness of killing or reducing *Escherichia coli* (*E. coli*), using Shake Flask ASTM Method E2149-10 on treated PET from Amcor. This test method is designed to evaluate the antimicrobial activity of non-leaching, antimicrobial materials for routine quality control and screening tests in order to overcome difficulties in using classical antimicrobial test methods to evaluate substrate-bound antimicrobials. This dynamic shake flask test was developed for retrieval of aliquot samples at different contact times.

Study Design

The *E. coli* (lot number 168756) was purchased from Quanti-Cult™ and is derived from original ATCC® stock cultures.

The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks and a wrist action shaker. The concentration of the suspension is determined using serial dilution and plate counts to determine the amount of Colony Forming Units (CFU's)/ml of suspension. The material tested in this study was small antimicrobial treated PET beads. Fifteen grams were added to 250 ml Erlenmeyer flasks. Fifty milliliters of phosphate buffer inoculated with *E. coli*, to an approximate concentration of 1×10$^5$ CFU/ml was added to the flasks, including a control flask. The flasks were placed on Burrell® Wrist Action Shaker at the highest wrist action speed, and shaken for one hour. At the end of the hour, aliquots of each were taken and serial dilutions done. Difco™ Tryptic Soy Agar (lot number 1326359) was added to the plates and swirled to mix. Agar was allowed to solidify and samples were incubated for 24 hours at 35° C. to evaluate the effectiveness of the formulations in reducing *E. coli*.

Results

After 1 hour the material was effective in killing>99.9% of the bacteria that it was exposed to (Table 1)

One Hour Time Point

| Material | Avg. CFU/ml | % Reduction | Log | Log Reduction |
|---|---|---|---|---|
| Bacteria Control | 1.14 × 10$^5$ | Not applicable | 5.0 | Not applicable |
| PET Lot 3 | 0 | >99.9 | 0 | 5 |

Example 7

The treated PET pellets Lot 3 was used as a masterbatch to be compounded with PET and blow molded into four ounce containers. A 1% and 3% by weight masterbatch pellets were mixed into virgin PET pellets, melt blown into containers and tested for microbial activity.

Purpose:

The purpose of this study is to evaluate the effectiveness of killing or reducing *Escherichia coli* (*E. coli*), using Shake Flask ASTM Method E2149-10 on treated PET blow molded containers. This test method is designed to evaluate the antimicrobial activity of non-leaching, antimicrobial materials for routine quality control and screening tests in order to overcome difficulties in using classical antimicrobial test methods to evaluate substrate-bound antimicrobials. This dynamic shake flask test was developed for retrieval of aliquot samples at different contact times.

Study Design

The *E. coli* (lot number 168756) was purchased from Quanti-Cult™ and is derived from original ATCC® stock cultures.

The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks and a wrist action shaker. The concentration of the suspension is determined using serial dilution and plate counts to determine the amount of Colony Forming Units (CFU's)/ml of suspension.

The material tested in this study was small antimicrobial treated PET beads. Fifteen grams were added to 250 ml Erlenmeyer flasks. Fifty milliliters of phosphate buffer inoculated with $E.\ coli$, to an approximate concentration of $1\times10^5$ CFU/ml was added to the flasks, including a control flask The flasks were placed on Burrell® Wrist Action Shaker at the highest wrist action speed, and shaken for one hour. At the end of the hour, aliquots of each were taken and serial dilutions done. Difco™ Tryptic Soy Agar (lot number 1326359) was added to the plates and swirled to mix. Agar was allowed to solidify and samples were incubated for 24 hours at 35° C. to evaluate the effectiveness of the formulations in reducing $E.\ coli$.

Results

After 1 hour the material was effective in killing >99.9% of the bacteria that it was exposed to.

One Hour Time Point

| Material | Avg. CFU/ml | % Reduction | Log | Log Reduction |
|---|---|---|---|---|
| Bacteria Control | $1.14 \times 10^5$ | Not applicable | 5.0 | Not applicable |
| PET | 0 | >99.9 | 0 | 5 |

Twenty Four Hour Time Point

| Material | Average CFU/ml | % Reduction | Log | Log Red. |
|---|---|---|---|---|
| Bacteria Control | $1.0 \times 10^6$ | Not applicable | 6.0 | Not applicable |
| Control Bottle (3) | $8.5 \times 10^4$ | 90.1 | 4.9 | 1.1 |
| 1% Resin (Bottle 2) | $1.2 \times 10^2$ | 99.9 | 2.1 | 3.9 |
| 3% Resin (Bottle 1) | $7.08 \times 10^5$ | 29.2 | 5.9 | 0.1 |

Conclusions

Based on the preliminary data, the treated polypropylene blow molded containers appears to be efficacious in killing $E.\ coli$.

Example 8

Huber 250 precipitated silica was dispersed in DI water adjusted to a pH of 10 with sodium hydroxide. To this was added drop wise, 5772 (72% non-volatile in methanol) and vinyltrimethoxysilane (VTM) under constant agitation. This was allowed to mix for 60 minutes. The solution was weighed, poured into a shallow glass dish, placed in an air circulating oven at 45° Centigrade for 24 hours. The dried powder was removed from the oven, reweighed, and ground using a mortar and pestle.

Example 9

Part A: 5772 and VTM were placed in a beaker with agitation. Water at pH 10 was added drop wise allowing mixing for 60 minutes. Part B: Huber 250 precipitated silica was dispersed in DI water adjusted to a pH of 10 with sodium hydroxide.

Part A was slowly added to Part B under constant agitation. This was allowed to mix for 60 minutes. The solution was weighed, poured into a shallow glass dish, placed in an air circulating oven at 45° Centigrade for 24 hours. The dried powder was removed from the oven, reweighed, and ground using a mortar and pestle.

All quantities are in grams.

|  | 1 | 2A | 2B |
|---|---|---|---|
| Huber 250 | 25 |  | 25 |
| Water pH 10 | 200 | 5 | 100 |
| 5772 @ 72% | 2.08 | 2.08 |  |
| VTM | 0.5 | 0.5 |  |
|  |  | mix into 2B |  |
| init wt |  | 228.3 | 120.5 |
| final wt |  | 27.3 | 28.25 |

Huber Silica

|  | 103 | 113 | 165 | 250 |
|---|---|---|---|---|
| Type | Silica | Silica | Silica | Ca Silicate |
| pH | 7.5 | 7.1 | 6.9 | 9.8 |
| Particle size | 8 um | 9 um | 14 um | 18 um |
| % water | 7.4 | 5.7 | 6.3 | 5.0 |

Example 10

Part A: 5772 and MPTMS were placed in a beaker with agitation. Water at pH 10 was added drop wise allowing mixing for 60 minutes. Part B: Huber 103 precipitated silica was dispersed in DI water adjusted to a pH of 10 with sodium hydroxide.

Part A was slowly added to Part B under constant agitation. This was allowed to mix for 60 minutes. The solution was weighed, poured into a shallow glass dish, placed in an air circulating oven at 45° Centigrade for 24 hours. The dried powder was removed from the oven, reweighed, broken up and sieved.

|  | B | A |
|---|---|---|
| Huber 103 | 10# |  |
| Water pH 10 | 20# | 0.52# |
| 5772 @ 72% |  | 2.48# |
| mptms |  | 0.2# |

Antimicrobial Activity Evaluation Treated Silica

Purpose:

The material tested was a two part system. Part A consisted of Huber 250 silica and Water. Part B contained 5772@ 72% NVC and VTMS and water@pH=10. The control used was the Huber 250 silica lab sample QS Example #9.

The purpose of this study was to evaluate the effectiveness of killing or reducing *Escherichia coli* (*E. coli*), using Shake Flask ASTM Method E2149-10 (1). This test method is designed to evaluate the antimicrobial activity of non-leaching, antimicrobial materials for routine quality control and screening tests in order to overcome difficulties in using classical antimicrobial test methods to evaluate substrate-bound antimicrobials. This dynamic shake flask test was developed for retrieval at different contact times.

Study Design

The *E. coli* (lot number 981476) was purchased from Quanti-Cult™ and is derived from original ATCC® stock cultures. They are received dehydrated. They are then rehydrated with the supplied buffer and transferred to a sterile Erlenmeyer flask containing 100 ml of sterile Tryptic Soy Broth (lot #A1327) and incubated overnight at 35° C. The rehydrated cultures are only used for testing on the day of rehydration. A 1 ml aliquot of that culture is put into a sterile flask with fresh broth daily. If there will be a lapse in the use of the culture, for instance over the weekend, a streak plate of the culture can be made, incubated overnight and stored in the refrigerator for longer periods of time than those grown in flasks.

These cultures can be checked for contamination in a couple of different ways. If the streak plate culture has non-uniform colonies or the flask cultures have a filmy appearance, the culture is most likely contaminated and the entire culturing process has to be repeated starting with a new dehydrated sample. Cultures can easily be contaminated by air borne bacteria or surface bacteria, therefore, great care has to be taken to ensure the culture is not contaminated with other unwanted bacterium.

The antimicrobial activity of a substrate-bound, non-leaching antimicrobial agent is dependent upon direct contact of microbes with the active chemical agent. This test determines the antimicrobial activity of a treated specimen by shaking test material in a concentrated bacterial suspension for specified contact times. This is done using sterile Erlenmeyer flasks and a wrist action shaker. The concentration of the suspension is determined using serial dilution and plate counts to determine the amount of Colony Forming Units (CFU's)/ml of suspension.

The material tested in this study was an experimental silica containing 0.5% QSI Example #2. An untreated sample using Huber 250 Silica was run in an earlier study, however was only tested through the two hour time point due to a mechanical failure of the shaker. To 100 grams of sterile saline, 2.5 g of the treated Silica II powder was added, inoculated with approximately $2.5 \times 10^3$ CFU/ml *E. coli*. To another sterile Erlenmeyer flask, 100 gram of sterile saline with approximately $2.5 \times 10^3$ CFU/ml *E. coli* was prepared to represent the bacteria control. The flasks were placed on Burrell® Wrist Action Shaker at the highest wrist action speed, and shook for 1, 2, and 24 hours. Using the direct plate count method in triplicate, 1 ml of the inoculated saline was taken from each flask and added to sterile Petri dishes at the respective time points. Difco™ Tryptic Soy Agar (lot number 1326359) was added to the plates and swirled to mix. Agar was allowed to solidify for 20 minutes and samples were incubated for 24 hours at 35° C. to evaluate the effectiveness of the new formulation in reducing *E. coli*.

Results

TABLE 1

| One Hour Time Point |||
| --- | --- | --- |
| Material | Average CFU/ml | % Reduction |
| Bacteria Control | TNTC[1] | Not applicable |
| Treated Silica # 2 | 43 CFU/ml | 99.8 |
| Untreated Silica | TNTC | 0 |

[1]Too Numerous To Count

TABLE 2

| Two Hour Time Point |||
| --- | --- | --- |
| Material | Average CFU/ml | % Reduction |
| Bacteria Control | TNTC | Not applicable |
| Treated Silica #2 | 43 CFU/ml | 99.8 |
| Untreated Silica | TNTC | 0 |

TABLE 3

| Twenty Four Hour Time Point |||
| --- | --- | --- |
| Material | Average CFU/ml | % Reduction |
| Bacteria Control | TNTC | Not applicable |
| Treated Silica #2 | 0 | 100 |

Example 11

TiO2 was dispersed in DI water adjusted to a pH of 10 with sodium hydroxide. To this was added drop wise, 5772 (72% non-volatile in methanol) and methacryloxypropyltrimethoxysilane (MAPTMS) under constant agitation. This was allowed to mix for 60 minutes. The solution was weighed, poured into a shallow glass dish, placed in an air circulating oven at 45° Centigrade for 24 hours. The dried powder was removed from the oven, reweighed, and ground using a mortar and pestle.

| | Mw | 33-1 | 33-2 |
| --- | --- | --- | --- |
| TiO2 (AMTI-P) | | 2270 | 2270 |
| 5700 @ 42% | 496 | 23 (54.7) | 56.8 (135.1) |
| Z-6030 | 248 | 23 | 56.8 |
| H2O | 18 | 4.5 | 9 |
| moles 5700/6030/H2O | | .46/.93/2.1 | .14/.23/.5 |

What is claimed is:

1. A composition of matter, wherein said composition of matter is an incipient mixture of:
   (i) at least one first trialkoxylated organofunctional silane, wherein said trialkoxylated organofunctional silane is selected from the group consisting of:
   a. $(R'O)_3SiC_dH_{2d}S^+(R^4)_2X^-$, wherein R' is an alkyl radical of from 1 to 4 carbon atoms, wherein $R^4$ is independently an alkyl group or aralkyl group wherein there is a total of less than 60 carbon atoms in the molecule, wherein d is an integer of 1 or greater, and wherein $X^-$ is a water soluble monovalent anion;

b. $(R'O)_3SiC_dH_{2d}S^+C(NH_2)_2X^-$, wherein R' is an alkyl radical of from 1 to 4 carbon atoms, wherein d is an integer of 1 or greater, and wherein $X^-$ is a water soluble monovalent anion;
c. $(R'O)_3SiC_dH_{2d}P^+(R^6)_3X^-$, wherein R' is an alkyl radical of from 1 to 4 carbon atoms, wherein $R^6$ is independently selected from an alkyl group or aralkyl group wherein there is a total of less than 60 carbon atoms in the molecule, wherein d is an integer of 1 or greater, and wherein $X^-$ is a water soluble monovalent anion;
d. $(R'O)_3Si$—$(R'')N^+(CH_3)_2(R''')Cl^-$, wherein R' is an alkyl radical of from 1 to 4 carbon atoms, wherein R" is an alkylene radical of three to six carbon atoms, and wherein R''' is an alkyl radical of 10 to 22 carbon atoms;
e. $(R'O)_3Si$—$(C_dH_{2d})Cl$, wherein R' is an alkyl radical of from 1 to 4 carbon atoms, and wherein d is an integer of 1 or greater;
f. $(R'O)_3Si$—$(C_dH_{2d})NH$—$C$=$O$—$NH_2$, wherein R' is an alkyl radical of from 1 to 4 carbon atoms, and wherein d is an integer of 1 or greater;
g. $(R'O)_3SiCH_2CH$=$CH_2$, wherein R' is an alkyl radical of from 1 to 4 carbon atoms;
h.

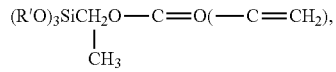

wherein R' is an alkyl radical of from 1 to 4 carbon atoms;
i. $(R'O)_3SiC_3H_6NHCH_2CH_2NH$-benzyl-$CH$=$CH_2$, wherein R' is an alkyl radical of from 1 to 4 carbon atoms;
j. $(R'O)_3SiC_3H_6NHCH_2CH_2NH$-benzyl-$CH$=$CH_2 \cdot HCl$, wherein R' is an alkyl radical of from 1 to 4 carbon atoms;
k. $(R'O)_3Si(CF_2)_nCF_3$, wherein R' is an alkyl radical of from 1 to 4 carbon atoms, and wherein n has a value of from 1 to 10, and mixtures of such silanes;

(ii) at least one second trialkoxylated organofunctional silane, wherein said trialkoxylated organofunctional silane is selected from the group consisting of:
a. $(R'O)_3SiC_dH_{2d}S^+(R^4)_2X^-$, wherein R' is an alkyl radical of from 1 to 4 carbon atoms, wherein $R^4$ is independently an alkyl group or aralkyl group wherein there is a total of less than 60 carbon atoms in the molecule, wherein d is an integer of 1 or greater, and wherein $X^-$ is a water soluble monovalent anion;
b. $(R'O)_3SiC_dH_{2d}S^+C(NH_2)_2X^-$, wherein R' is an alkyl radical of from 1 to 4 carbon atoms, wherein d is an integer of 1 or greater, and wherein $X^-$ is a water soluble monovalent anion;
c. $(R'O)_3SiC_dH_{2d}P^+(R^6)_3X^-$, wherein R' is an alkyl radical of from 1 to 4 carbon atoms, wherein $R^6$ is independently selected from an alkyl group or aralkyl group wherein there is a total of less than 60 carbon atoms in the molecule, wherein d is an integer of 1 or greater, and wherein $X^-$ is a water soluble monovalent anion;
d. $(R'O)_3Si$—$(R'')N^+(CH_3)_2(R''')Cl^-$, wherein R' is an alkyl radical of from 1 to 4 carbon atoms, wherein R" is an alkylene radical of three to six carbon atoms, and wherein R''' is an alkyl radical of 10 to 22 carbon atoms;
e. $(R'O)_3Si$—$(C_dH_{2d})SH$, wherein R' is an alkyl radical of from 1 to 4 carbon atoms, and wherein d is an integer of 1 or greater;
f. $(R'O)_3Si$—$(C_dH_{2d})Cl$, wherein R' is an alkyl radical of from 1 to 4 carbon atoms, and wherein d is an integer of 1 or greater;
g. $(R'O)_3Si$—$(C_dH_{2d})NH$—$C$=$O$—$NH_2$, wherein R' is an alkyl radical of from 1 to 4 carbon atoms, and wherein d is an integer of 1 or greater;
h. $(R'O)_3SiCH$=$CH_2$, wherein R' is an alkyl radical of from 1 to 4 carbon atoms;
i. $(R'O)_3SiCH_2CH$=$CH_2$, wherein R' is an alkyl radical of from 1 to 4 carbon atoms;
j.

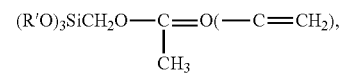

wherein R' is an alkyl radical of from 1 to 4 carbon atoms;
k. $(R'O)_3SiC_3H_6O$—$C$—$C$=$CH_2$, wherein R' is an alkyl radical of from 1 to 4 carbon atoms;
l. $(R'O)_3SiC_3H_6NH$—$C$=$O($—$OCH_3)$, wherein R' is an alkyl radical of from 1 to 4 carbon atoms;
m. $(R'O)_3SiC_3H_6NHCH_2CH_2NH$-benzyl-$CH$=$CH_2$, wherein R' is an alkyl radical of from 1 to 4 carbon atoms;
n. $(R'O)_3SiC_3H_6NHCH_2CH_2NH$-benzyl-$CH$=$CH_2 \cdot HCl$, wherein R' is an alkyl radical of from 1 to 4 carbon atoms;
o. $(R'O)_3SiC_dH_{2d}N(H)(C_dH_{2d})NH_2$, wherein R' is an alkyl radical of from 1 to 4 carbon atoms, and wherein d is an integer of 1 or greater;
p. $(R'O)_3Si$—$(C_dH_{2d})NH_2$, wherein R' is an alkyl radical of from 1 to 4 carbon atoms, and wherein d is an integer of 1 or greater;
q. $(R'O)_3SiC_3H_6N$=$C$=$O$, wherein R' is an alkyl radical of from 1 to 4 carbon atoms;
r. Methacryloxypropyltrimethoxysilane;
s. $(R'O)_3SiC_3H_6OCH_2CH$—$CH_2$, wherein R' is an alkyl radical of from 1 to 4 carbon atoms;
t. $(R'O)_3Si(CF_2)_nCF_3$, wherein R' is an alkyl radical of from 1 to 4 carbon atoms, and wherein n has a value of from 1 to 10, and mixtures of such silanes;

(iii) a predetermined amount of acid or base; and
(iv) water, wherein said composition of matter is to be incorporated into at least one of a predetermined amount of formulated paint, a predetermined amount of resin, and a predetermined amount of plastic.

2. A composition of matter, wherein said composition of matter is a mixture of:
(i) at least one first trialkoxylated organofunctional silane, wherein said trialkoxylated organofunctional silane is selected from the group consisting of:
a. $(R'O)_3SiC_dH_{2d}S^+(R^4)_2X^-$, wherein R' is an alkyl radical of from 1 to 4 carbon atoms, wherein $R^4$ is independently an alkyl group or aralkyl group wherein there is a total of less than 60 carbon atoms in the molecule, wherein d is an integer of 1 or greater, and wherein $X^-$ is a water soluble monovalent anion;

b. $(R'O)_3SiC_dH_{2d}S^+C(NH_2)_2X^-$, wherein R' is an alkyl radical of from 1 to 4 carbon atoms, wherein d is an integer of 1 or greater, and wherein $X^-$ is a water soluble monovalent anion;
c. $(R'O)_3SiC_dH_{2d}P^+(R^6)_3X^-$, wherein R' is an alkyl radical of from 1 to 4 carbon atoms, wherein $R^6$ is independently selected from an alkyl group or aralkyl group wherein there is a total of less than 60 carbon atoms in the molecule, wherein d is an integer of 1 or greater, and wherein $X^-$ is a water soluble monovalent anion;
d. $(R'O)_3Si—(R'')N^+(CH_3)_2(R''')Cl^-$, wherein R' is an alkyl radical of from 1 to 4 carbon atoms, wherein R" is an alkylene radical of three to six carbon atoms, and wherein R'" is an alkyl radical of 10 to 22 carbon atoms;
e. $(R'O)_3Si—(C_dH_{2d})Cl$, wherein R' is an alkyl radical of from 1 to 4 carbon atoms, and wherein d is an integer of 1 or greater;
f. $(R'O)_3Si—(C_dH_{2d})NH—C=O—NH_2$, wherein R' is an alkyl radical of from 1 to 4 carbon atoms, and wherein d is an integer of 1 or greater;
g. $(R'O)_3SiCH_2CH=CH_2$, wherein R' is an alkyl radical of from 1 to 4 carbon atoms;
h.

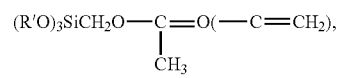

wherein R' is an alkyl radical of from 1 to 4 carbon atoms;
i. $(R'O)_3SiC_3H_6NHCH_2CH_2NH$-benzyl-$CH=CH_2$, wherein R' is an alkyl radical of from 1 to 4 carbon atoms;
j. $(R'O)_3SiC_3H_6NHCH_2CH_2NH$-benzyl-$CH=CH_2.HCl$, wherein R' is an alkyl radical of from 1 to 4 carbon atoms; and
k. $(R'O)_3Si(CF_2)_nCF_3$, wherein R' is an alkyl radical of from 1 to 4 carbon atoms, and wherein n has a value of from 1 to 10, and mixtures of such silanes;

(ii) at least one second trialkoxylated organofunctional silane, wherein said trialkoxylated organofunctional silane is selected from the group consisting of:
a. $(R'O)_3SiC_dH_{2d}S^+(R^4)_2X^-$, wherein R' is an alkyl radical of from 1 to 4 carbon atoms, wherein $R^4$ is independently an alkyl group or aralkyl group wherein there is a total of less than 60 carbon atoms in the molecule, wherein d is an integer of 1 or greater, and wherein $X^-$ is a water soluble monovalent anion;
b. $(R'O)_3SiC_dH_{2d}S^+C(NH_2)_2X^-$, wherein R' is an alkyl radical of from 1 to 4 carbon atoms, wherein d is an integer of 1 or greater, and wherein $X^-$ is a water soluble monovalent anion;
c. $(R'O)_3SiC_dH_{2d}P^+(R^6)_3X^-$, wherein R' is an alkyl radical of from 1 to 4 carbon atoms, wherein $R^6$ is independently selected from an alkyl group or aralkyl group wherein there is a total of less than 60 carbon atoms in the molecule, wherein d is an integer of 1 or greater, and wherein $X^-$ is a water soluble monovalent anion;
d. $(R'O)_3Si—(R'')N^+(CH_3)_2(R''')Cl^-$, wherein R' is an alkyl radical of from 1 to 4 carbon atoms, wherein R" is an alkylene radical of three to six carbon atoms, and wherein R'" is an alkyl radical of 10 to 22 carbon atoms;
e. $(R'O)_3Si—(C_dH_{2d})SH$, wherein R' is an alkyl radical of from 1 to 4 carbon atoms, and wherein d is an integer of 1 or greater;
f. $(R'O)_3Si—(C_dH_{2d})Cl$, wherein R' is an alkyl radical of from 1 to 4 carbon atoms, and wherein d is an integer of 1 or greater;
g. $(R'O)_3Si—(C_dH_{2d})NH—C=O—NH_2$, wherein R' is an alkyl radical of from 1 to 4 carbon atoms, and wherein d is an integer of 1 or greater;
h. $(R'O)_3SiCH=CH_2$, wherein R' is an alkyl radical of from 1 to 4 carbon atoms;
i. $(R'O)_3SiCH_2CH=CH_2$, wherein R' is an alkyl radical of from 1 to 4 carbon atoms;
j.

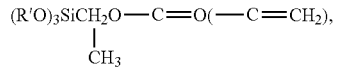

wherein R' is an alkyl radical of from 1 to 4 carbon atoms;
k. $(R'O)_3SiC_3H_6O—C—C=CH_2$, wherein R' is an alkyl radical of from 1 to 4 carbon atoms;
l. $(R'O)_3SiC_3H_6NH—C=O(—OCH_3)$, wherein R' is an alkyl radical of from 1 to 4 carbon atoms;
m. $(R'O)_3SiC_3H_6NHCH_2CH_2NH$-benzyl-$CH=CH_2$, wherein R' is an alkyl radical of from 1 to 4 carbon atoms;
n. $(R'O)_3SiC_3H_6NHCH_2CH_2NH$-benzyl-$CH=CH_2$.HCl, wherein R' is an alkyl radical of from 1 to 4 carbon atoms;
o. $(R'O)_3SiC_dH_{2d}N(H)(C_dH_{2d})NH_2$, wherein R' is an alkyl radical of from 1 to 4 carbon atoms, and wherein d is an integer of 1 or greater;
p. $(R'O)_3Si—(C_dH_{2d})NH_2$, wherein R' is an alkyl radical of from 1 to 4 carbon atoms, and wherein d is an integer of 1 or greater;
q. $(R'O)_3SiC_3H_6N=C=O$, wherein R' is an alkyl radical of from 1 to 4 carbon atoms;
r. Methacryloxypropyltrimethoxysilane;
s. $(R'O)_3SiC_3H_6OCH_2CH—CH_2$, wherein R' is an alkyl radical of from 1 to 4 carbon atoms;
t. $(R'O)_3Si(CF_2)_nCF_3$, wherein R' is an alkyl radical of from 1 to 4 carbon atoms, and wherein n has a value of from 1 to 10, and mixtures of such silanes;
(iii) a predetermined amount of acid or base;
(iv) water; and
(v) a predetermined amount of formulated paint, wherein said composition of matter has anti-microbial properties.

3. The composition of matter of claim 1, wherein said composition of matter has anti-microbial properties.

4. The composition of matter of claim 1, wherein said composition of matter has adhesion properties.

5. The composition of matter of claim 1, wherein said composition of matter has a large number of silanol groups bonded to silicon atoms.

6. The composition of matter of claim 1, wherein said composition of matter provides anti-microbial and/or adhesion properties to paints when incorporated therein.

7. The composition of matter of claim 2, wherein said composition of matter has a large number of silanol groups bonded to silicon atoms.

8. The composition of matter of claim 1, wherein said composition of matter provides anti-microbial and/or adhesion properties to a bag when incorporated therein.

9. The composition of matter of claim 8, wherein said bag is a food containing bag, a food storage bag, a blood storage bag, a blood plasma storage bag, or a blood platelet storage bag.

10. A composition of matter, wherein said composition of matter is a mixture of:
(i) at least one first trialkoxylated organofunctional silane, wherein said trialkoxylated organofunctional silane is selected from the group consisting of:
 a. $(R'O)_3SiC_dH_{2d}S^+(R^4)_2X^-$, wherein R' is an alkyl radical of from 1 to 4 carbon atoms, wherein $R^4$ is independently an alkyl group or aralkyl group wherein there is a total of less than 60 carbon atoms in the molecule, wherein d is an integer of 1 or greater, and wherein $X^-$ is a water soluble monovalent anion;
 b. $(R'O)_3SiC_dH_{2d}S^+C(NH_2)_2X^-$, wherein R' is an alkyl radical of from 1 to 4 carbon atoms, wherein d is an integer of 1 or greater, and wherein $X^-$ is a water soluble monovalent anion;
 c. $(R'O)_3SiC_dH_{2d}P^+(R^6)_3X^-$, wherein R' is an alkyl radical of from 1 to 4 carbon atoms, wherein $R^6$ is independently selected from an alkyl group or aralkyl group wherein there is a total of less than 60 carbon atoms in the molecule, wherein d is an integer of 1 or greater, and wherein $X^-$ is a water soluble monovalent anion;
 d. $(R'O)_3Si—(R")N^+(CH_3)_2(R''')Cl^-$, wherein R' is an alkyl radical of from 1 to 4 carbon atoms, wherein R" is an alkylene radical of three to six carbon atoms, and wherein R''' is an alkyl radical of 10 to 22 carbon atoms;
 e. $(R'O)_3Si—(C_dH_{2d})Cl$, wherein R' is an alkyl radical of from 1 to 4 carbon atoms, and wherein d is an integer of 1 or greater;
 f. $(R'O)_3Si—(C_dH_{2d})NH—C=O—NH_2$, wherein R' is an alkyl radical of from 1 to 4 carbon atoms, and wherein d is an integer of 1 or greater;
 g. $(R'O)_3SiCH_2CH=CH_2$, wherein R' is an alkyl radical of from 1 to 4 carbon atoms;
 h.

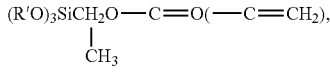

wherein R' is an alkyl radical of from 1 to 4 carbon atoms;
 i. $(R'O)_3SiC_3H_6NHCH_2CH_2NH$-benzyl-$CH=CH_2$, wherein R' is an alkyl radical of from 1 to 4 carbon atoms;
 j. $(R'O)_3SiC_3H_6NHCH_2CH_2NH$-benzyl-$CH=CH_2$·HCl, wherein R' is an alkyl radical of from 1 to 4 carbon atoms; and
 k. $(R'O)_3Si(CF_2)_nCF_3$, wherein R' is an alkyl radical of from 1 to 4 carbon atoms, and wherein n has a value of from 1 to 10, and mixtures of such silanes;
(ii) at least one second trialkoxylated organofunctional silane, wherein said trialkoxylated organofunctional silane is selected from the group consisting of:
 a. $(R'O)_3SiC_dH_{2d}S^+(R^4)_2X^-$, wherein R' is an alkyl radical of from 1 to 4 carbon atoms, wherein $R^4$ is independently an alkyl group or aralkyl group wherein there is a total of less than 60 carbon atoms in the molecule, wherein d is an integer of 1 or greater, and wherein $X^-$ is a water soluble monovalent anion;
 b. $(R'O)_3SiC_dH_{2d}S^+C(NH_2)_2X^-$, wherein R' is an alkyl radical of from 1 to 4 carbon atoms, wherein d is an integer of 1 or greater, and wherein $X^-$ is a water soluble monovalent anion;
 c. $(R'O)_3SiC_dH_{2d}P^+(R^6)_3X^-$, wherein R' is an alkyl radical of from 1 to 4 carbon atoms, wherein $R^6$ is independently selected from an alkyl group or aralkyl group wherein there is a total of less than 60 carbon atoms in the molecule, wherein d is an integer of 1 or greater, and wherein $X^-$ is a water soluble monovalent anion;
 d. $(R'O)_3Si—(R")N^+(CH_3)_2(R''')Cl^-$, wherein R' is an alkyl radical of from 1 to 4 carbon atoms, wherein R" is an alkylene radical of three to six carbon atoms, and wherein R''' is an alkyl radical of 10 to 22 carbon atoms;
 e. $(R'O)_3Si—(C_dH_{2d})SH$, wherein R' is an alkyl radical of from 1 to 4 carbon atoms, and wherein d is an integer of 1 or greater;
 f. $(R'O)_3Si—(C_dH_{2d})Cl$, wherein R' is an alkyl radical of from 1 to 4 carbon atoms, and wherein d is an integer of 1 or greater;
 g. $(R'O)_3Si—(C_dH_{2d})NH—C=O—NH_2$, wherein R' is an alkyl radical of from 1 to 4 carbon atoms, and wherein d is an integer of 1 or greater;
 h. $(R'O)_3SiCH=CH_2$, wherein R' is an alkyl radical of from 1 to 4 carbon atoms;
 i. $(R'O)_3SiCH_2CH=CH_2$, wherein R' is an alkyl radical of from 1 to 4 carbon atoms;
 j.

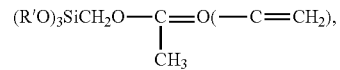

wherein R' is an alkyl radical of from 1 to 4 carbon atoms;
 k. $(R'O)_3SiC_3H_6O—C—C=CH_2$, wherein R' is an alkyl radical of from 1 to 4 carbon atoms;
 l. $(R'O)_3SiC_3H_6NH—C=O(—OCH_3)$, wherein R' is an alkyl radical of from 1 to 4 carbon atoms;
 m. $(R'O)_3SiC_3H_6NHCH_2CH_2NH$-benzyl-$CH=CH_2$, wherein R' is an alkyl radical of from 1 to 4 carbon atoms;
 n. $(R'O)_3SiC_3H_6NHCH_2CH_2NH$-benzyl-$CH=CH_2$·HCl, wherein R' is an alkyl radical of from 1 to 4 carbon atoms;
 o. $(R'O)_3SiC_dH_{2d}N(H)(C_dH_{2d})NH_2$, wherein R' is an alkyl radical of from 1 to 4 carbon atoms, and wherein d is an integer of 1 or greater;
 p. $(R'O)_3Si—(C_dH_{2d})NH_2$, wherein R' is an alkyl radical of from 1 to 4 carbon atoms, and wherein d is an integer of 1 or greater;
 q. $(R'O)_3SiC_3H_6N=C=O$, wherein R' is an alkyl radical of from 1 to 4 carbon atoms;
 r. Methacryloxypropyltrimethoxysilane;
 s. $(R'O)_3SiC_3H_6OCH_2CH—CH_2$, wherein R' is an alkyl radical of from 1 to 4 carbon atoms;
 t. $(R'O)_3Si(CF_2)_nCF_3$, wherein R' is an alkyl radical of from 1 to 4 carbon atoms, and wherein n has a value of from 1 to 10, and mixtures of such silanes;

(iii) a predetermined amount of acid or base;
(iv) water; and
(v) a predetermined amount of plastic in a generally liquid state, wherein said composition of matter provides anti-microbial properties to a plastic article formed therefrom.

11. The composition of matter of claim 10, wherein said plastic article is a food containing bag, a food storage bag, a blood storage bag, a blood plasma storage bag, or a blood platelet storage bag.

12. The composition of matter of claim 10, wherein said composition of matter has a large number of silanol groups bonded to silicon atoms.

13. The composition of matter of claim 2, wherein said composition of matter provides adhesion properties.

14. The composition of matter of claim 10, wherein said composition of matter provides adhesion properties.

\* \* \* \* \*